United States Patent [19]

Savkar et al.

[11] Patent Number: 5,445,033
[45] Date of Patent: Aug. 29, 1995

[54] BOTTOM POUR MELT FLOW RATE MEASUREMENT USING MAGNETIC FIELD

[75] Inventors: Sudhir D. Savkar, Schenectady; Walter Whipple, III, Amsterdam; Lawson P. Harris, Scotia, all of N.Y.

[73] Assignee: General Electric Company, Schenectady, N.Y.

[21] Appl. No.: 295,566

[22] Filed: Aug. 25, 1994

Related U.S. Application Data

[62] Division of Ser. No. 37,759, Mar. 26, 1993, abandoned.

[51] Int. Cl.6 .................................................. G01F 1/00
[52] U.S. Cl. ..................................... 73/861.12; 75/331
[58] Field of Search ............ 73/861.11, 861.12, 861.16, 73/861.17, 861.13; 75/331, 336

[56] References Cited

U.S. PATENT DOCUMENTS 3,566,684 3/1971 King ................................. 73/861.13
5,084,091 1/1992 Yolton ................................... 75/338
5,147,448 9/1992 Roberts et al. ....................... 75/331
5,280,726 1/1994 Urbanic et al. ................... 73/861.12

Primary Examiner—Hezron E. Williams
Assistant Examiner—Ronald L. Biegel
Attorney, Agent, or Firm—Paul R. Webb, II

[57] ABSTRACT

This invention relates to an apparatus and method for directly measuring the bottom pour flow rate from heated ceramic crucible, hearth/tundish combinations used in metals refining/processing industry, plasma arc melting process (PAM), a cold hearth process or other similar processes such as for pouring ingots. Such structures of this type generally allow the bottom pour flow rate to be accurately measured in relative real time without adversely affecting the flow while withstanding the hostile surroundings typically associate with a heated crucible, tundishes, PAM, cold hearth process or other similar processes.

9 Claims, 2 Drawing Sheets

BOTTOM POUR MELT FLOW RATE MEASUREMENT USING MAGNETIC FIELD

This application is a division of application Ser. No. 08/037,759, filed Mar. 26, 1993, now abandoned.

BACKGROUND OF THE INVENTION

1. Field of the Invention

This invention relates to an apparatus and method for directly measuring the bottom pour flow rate from crucibles and tundishes of various designs. Examples include inductively heated ceramic crucibles, tundishes used for bottom pouring variety of metals including those used in the plasma arc melting (PAM) process, standard hearth/tundish and the cold hearth process. Such structures of this type generally allow the bottom pour flow rate to be accurately measured in relatively real time without adversely affecting the flow while withstanding the hostile surroundings typically associated with the heated crucibles, PAM, cold hearth process or other similar processes.

2. Description of the Related Art

It is known that in the process of pouring ingots or making powder from a variety of metals and alloys smelted in inductively heated ceramic crucibles, or hearth/tundish combinations commonly used in the metals industry, there is a need to know the instantaneous flow rate without any lags. For example, in the powder making process, the flow is measured as the rate of powder collected in a vessel located some distance from the atomizer. This introduces a time delay in the interpretation of the melt flow rate on the order of 1ifs of seconds up to a minute. In order to optimize the yield it is, therefore, critical to directly measure the flow rate (or equivalently velocity) of the melt as it leaves the tundish. Most of the standard techniques, such as venturi meters and vibrating tube mass flow meters, are unacceptable because of the difficulty of constructing such a device to survive in the hostile surroundings and the very limited space available in and around the crucible or tundish for the sensor. The three critical aspects of the problem are the hostile environment, limited space considerations and difficulty of bringing anything but electrical signals from the location of measurement. A more advantageous system, then, would be presented if these three critical aspects could be addressed in a flow rate measuring device.

In order to at least address the aspect of bringing only electrical signals from the location of measurements, a magnetic flow sensing device for measuring the blood flow typically through intravenous (IV) lines has been developed by Fischer and Porter. While these blood flow sensing systems employ an advantageous magnetic measuring device, these systems would not be easily adaptable to a melt from inductively heated ceramic crucibles, a hearth/tundish technique, a PAM process or a cold hearth process due to the space requirements and the hostile environment associated with the prior art processes. In particular, the blood flow sensing device is allowed to occupy a relatively large space around the IV line while the space around the melt guide tube (MGT) of the prior melt flow processes through which the liquid alloy flows is very limited. Also, the temperatures associated with measuring blood typically center around 97°–105° F. ($\approx$36°–41° C.) which is far below the temperature associated with the prior alloy melt flow processes which can reach temperatures as high as 3100° F. ($\approx$1700° C.). Consequently, a still further improved system would be presented if the advantageous magnetic sensing device could be employed in a relatively small space and could withstand a hostile environment.

It is apparent from the above that there exists a need in the art for an apparatus for measuring the bottom pour flow from a crucible or a tundish which can nonintrusively and directly measure the melt flow rate, and which at least equals the measuring capabilities of known magnetic flow sensing devices, but which at the same time is capable of being located in relatively small spaces and can withstand hostile environments especially those associated with the heated crucible, hearth/tundish combinations, PAM, cold hearth process and other related melt pouring processes. It is a purpose of this invention to fulfill this and other needs in the art in a manner more apparent to the skilled artisan once given the following disclosure.

SUMMARY OF THE INVENTION

Basically speaking, this invention fulfills these needs by providing an apparatus for directly measuring the bottom pour flow rate from a container, comprising a container having first and second ends, an opening substantially located on said second end of said container, a melt guide tube means located adjacent said container opening, an electro-magnetic coil means located adjacent to said melt guide tube means, a permanent magnet means located adjacent to said electro-magnetic coil means, an electrode means rigidly attached to said melt guide tube means which produces an electronic signal, and a signal detection and displaying means electrically connected to said electrode means.

In certain preferred embodiments, the liquid metallic material is nickel-based super-alloys, cobalt-based alloys, titanium-based alloys, iron-based alloys, or copper-based alloys. The electrode is constructed of the same material as the liquid metallic material. Also, the electro-magnetic coil and permanent magnets are attached to the top of the melt guide tube. Finally, the magnetic field could be pulsed either together with the permanent magnet or without it or use an electromagnet, but with fewer turns, as few as one.

In another further preferred embodiment, the bottom pour flow of metals from the inductively heated ceramic crucible, hearth/tundish combinations, PAM, cold hearth process or other similar process tundish is directly measured without adversely affecting the flow rate.

The preferred flow rate measurement system, according to this invention, offers the following advantages: good stability; compactness in size; improved durability; good flow rate measurement characteristics; good economy; and high strength for safety. In fact, in many of the preferred embodiments, these factors of compactness, durability and flow rate measurement are optimized to an extent considerably higher than heretofore achieved in prior, known flow rate measurement systems.

BRIEF DESCRIPTION OF THE DRAWINGS

The above and other features of the present invention which will become more apparent as the description proceeds are best understood by considering the following detailed description in conjunction with the accompanying drawings wherein like characters represent like parts throughout the several views and in which.

DETAILED DESCRIPTION OF THE INVENTION

Figure 1:
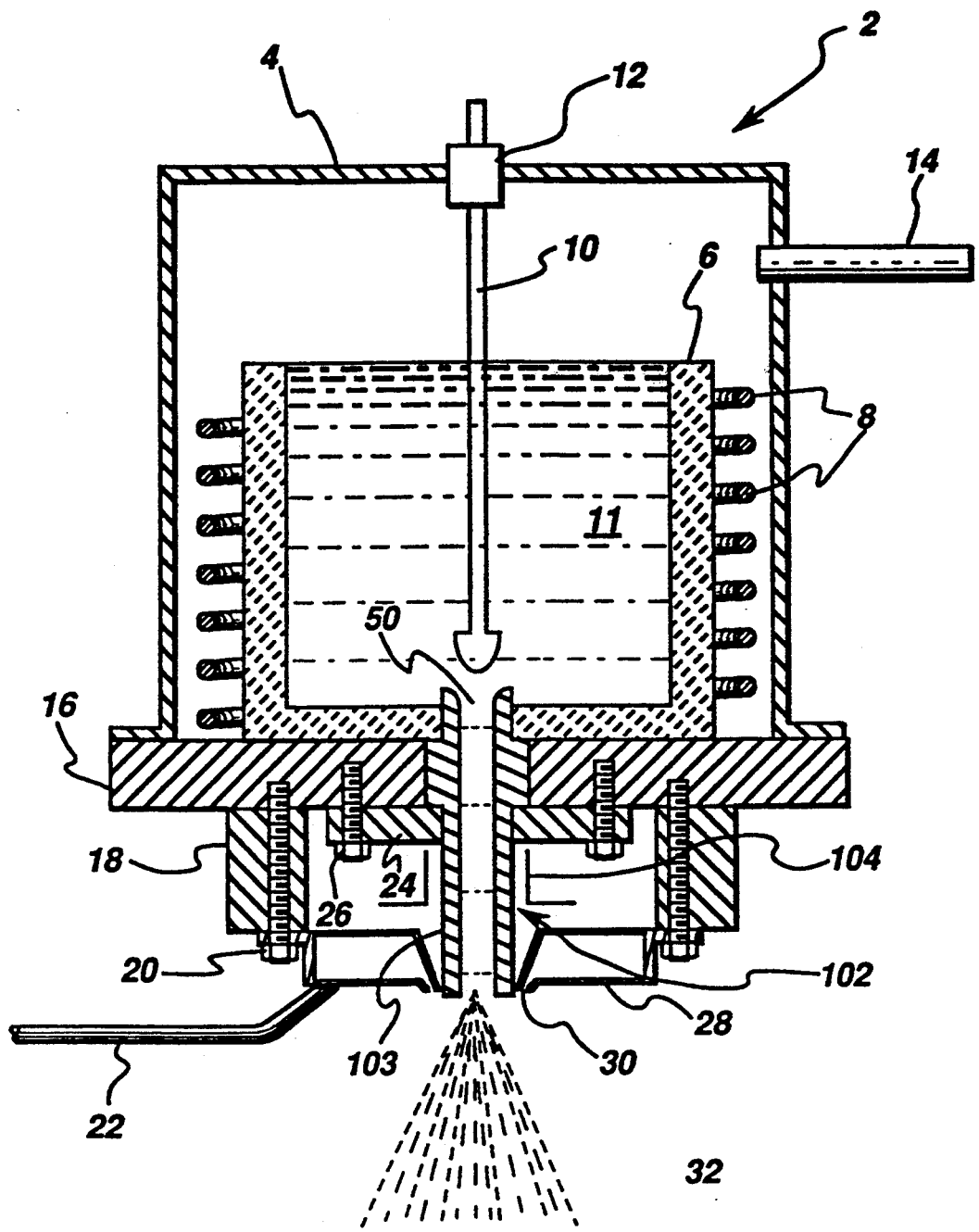
FIG. 1 is a side, plan view of a inductively heated ceramic crucible having a direct measurement, bottom pour flow rate system utilizing electromagnets and permanent magnets, according to the present invention.

FIG. 1 illustrates bottom pour flow rate detection apparatus 2. Apparatus 2, in part, includes conventional enclosure 4, conventional ceramic crucible 6, inductive heater coils 8, conventional movable stopper rod 10, pool 11, conventional rod holder 12, conventional pressurized gas supply 14, support plates 16, 18 and 24, conventional fasteners 20 and 26, conventional atomizing gas supply 22, conventional gas plenum 28, gas plenum exhaust 30, powder 32, flow 50, and detector 102. Detector 102 includes, in part, a generally cylindrical shaped melt guide tube (MGT) 103 and flow meter 104. MGT 103, preferably, is constructed of any suitable ceramic material such as boron nitride, aluminum oxide or zirconium dioxide. MGT 103 is positioned such that it is located concentric with the opening in crucible 6. MGT 103 is rigidly attached to crucible 6 by a conventional attachment. In one embodiment the MGT is approximately 2.5 inches long and with an internal bore of approximately ¼ inc. A portion of MGT 103 is located within gas plenum assembly 28 so that as melt flow 50 proceeds through MGT 103, flow 50 interacts with the gas which, typically, is argon at location 30 to form powder 32.

It is to be understood that a conventional hearth/tundish combinations, PAM process or cold hearth process are constructed in a very similar manner to crucible 6 and detecter 102 could be attached to the PAM process tundish or cold hearth process tundish in the same manner as detector 102 is attached to crucible 6. Also, while detector 102, preferably, is used to measure the flow rates of nickel-based alloys, titanium-based alloys, cobalt-based alloys, iron-based alloys, or copper-based alloys, the flow rates of other liquid materials can be measured with detector 102.

Figure 2:
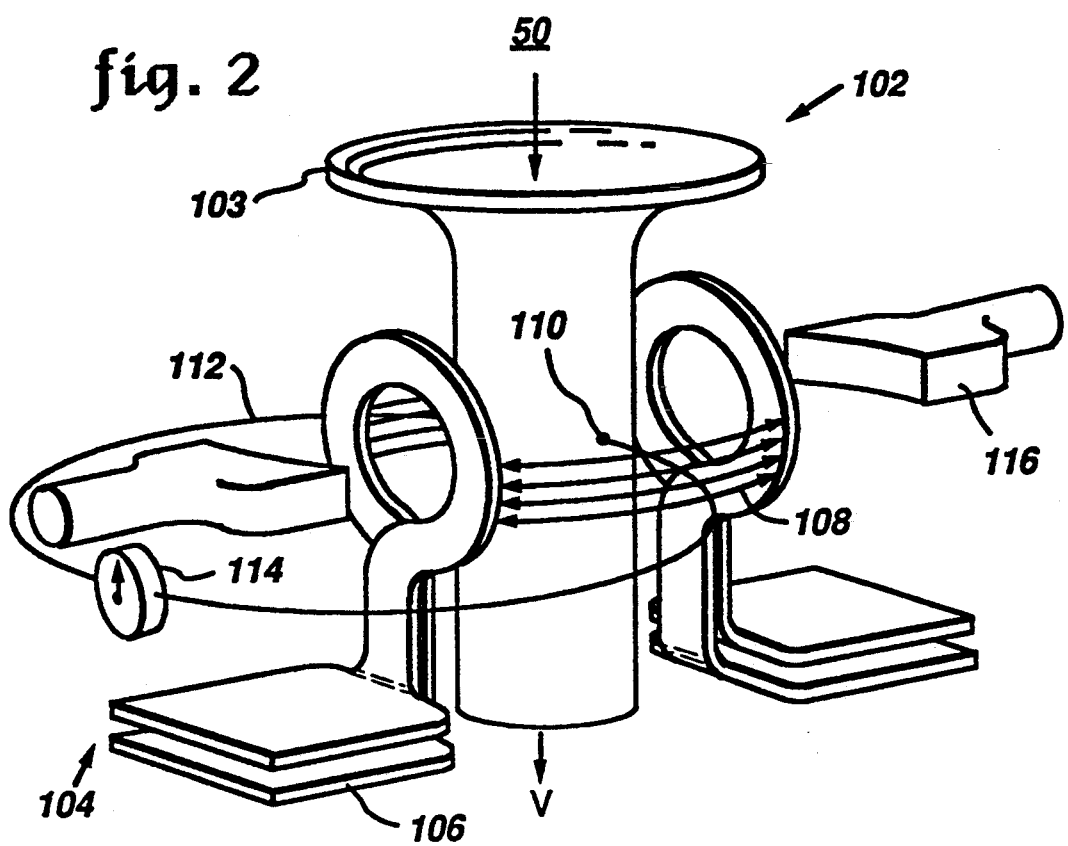
FIG. 2 is a schematic illustration of the flow rate meter, according to the present invention.

The basic principle of the flow meter is illustrated in FIG. 2. In this Figure MGT 103 is represented schematically as a tube carrying the melt flow 50. The cross magnetic field 108 of strength B (vectorially $\bar{B}$) is established by coil 106. The melt is assumed to flow with a vector velocity $\bar{V}$, and is assumed to be directed normal to the magnetic field 108. It follows then an electric field $\bar{E}$ will be induced which is orthogonal to both $\bar{B}$ and $\bar{V}$. This relationship (vectorially) is set forth in Equation 1:

$$\bar{E} = \bar{B} \times \bar{V} \tag{1}$$

Reducing the above to scalar terms there results the relationship as set forth in Equation 2:

$$\epsilon = BVd \tag{2}$$

where $\epsilon$ is the resulting emf induced, B is the applied magnetic field 108, V is the average speed of the melt and d is the diameter of MGT 103 at the point of measurement. Thus, by embedding two electrodes 110, disposed orthogonal to both the magnetic field 108 and the flow velocity (V), the emf generated can be measured. Electrodes 110 can be either made of the same material as the melt, since their only purpose is to establish an electric contact with the melt (the MGT 103 tends to run full at this point and there is a fairly large temperature drop through the wall to insure that the electrode will remain solid and the hole in the MGT is kept small), or they could be a higher melting refractory material such as tungsten. Electrodes 110 need not be large, just sufficiently large to make the contact, in other words the smallest possible diameter consistent with strength requirements to make the external connections. To put numbers to the relation, if the magnetic field is assumed to be about 3000 gauss (not a particularly high field), the melt velocity is about 1 m/s and the MGT diameter is about 0.01 m, the resulting emf generated is about 3 mV (0.003 Volt). This signal can be read with conventional voltmeter 114 connected by leads 112 to electrodes 110 but because of the possible problems with the background in the electrically noisy environment, the detection of the signal could be enhanced if the magnetic field is pulsed through well-known pulsing techniques at a sufficiently high, but fixed, frequency used to give a known fixed flux change, preferably, ±10%.

Figure 4:
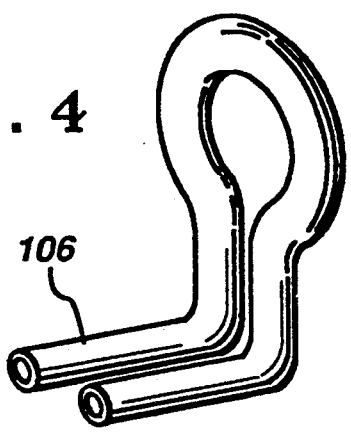
FIG. 4 is a schematic illustrations of a different embodiment of the electromagnetic coils.

The present invention provides several advantages over the prior art. First, is to recognize that the magnetic field does not have to be established electrically only. If one desires to use only a steady field, one could use one or more strong conventional permanent magnets 116. Secondly, since there is perceived to be a advantage to pulse the magnetic field, one could, either together with permanent magnet 116 or without it as dictated by design considerations, use an electromagnet 106, but one with fewer turns, as few as one. The point being that the electromagnetic field is determined by its ampere-turns, the product $N \times I$ (which is a product of the number of turns of the coil N and the current I). Thus, if the number of turns is substantially reduced and the current boosted up, one can achieve the same B as before, or maybe even stronger magnetic fields (especially when boosted by permanent magnet 116). Simultaneously, this allows one to use a thicker conductor on coil 106 (FIG. 2) which is easier to cool (or even a hollow conductor (FIG. 4) with gas or water cooling if needed) and with a lower overall resistance, which translates to a lower voltage drop. This makes the problem of insulating the conductor much simpler, or one may do away with insulation all together. Given a more robust conductor getting leads in and out becomes simpler since they can be of a large effective cross-section but thinner by virtue of being disc shaped, which disc becomes narrower and thicker as it "mates" to form the coil. In actuality, this may end up being a single piece without any joints. By going to large current and low voltage power suppliers there are many such available on the market. One such group of power supplies is made for welding. They are by their very nature much more robust. At the same time it is possible to pulse the field by a conventional pulsing techniques at a known frequency.

Figure 3A:
FIGS. 3a and 3b are schematic illustrations of two other embodiments of the permanent magnet.
Figure 3B:
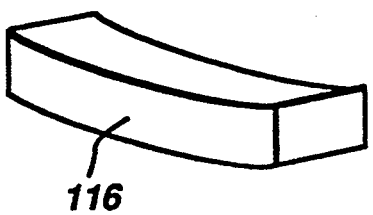

FIGS. 3a and 3b illustrate two other embodiments of permanent magnets 116. In particular, FIG. 3a shows a cylindrical-shaped permanent magnet 116 while FIG. 3b shows a partial-circular arc permanent magnet 116. Among other reasons, the operator may select one magnet 116 design over the other designs because of the space limitations around MGT 103 in which magnet 116 may be located.

In operation of apparatus 2, as melt flow 50 proceeds through MGT 103 in the direction of arrow A, flow 50 is capable of being a moving electrically conductive medium. This movement of the electrically conductive medium is sensed by electrode 110 and by the principle of electric induction, as discussed above, an emf is induced which is proportional to the velocity of melt flow 50. This induced emf can them be observed through use of the voltmeter 114 such that the velocity or flow rate of melt flow 50 can be accurately determined in a direct manner without having detection apparatus 2 adversely affect the flow rate of melt flow 50.

It is to be understood that detector 102 can be readily used in the same operating manner on a PAM or cold hearth process without adversely affecting the melt flow rate measuring characteristics of detector 102.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. An atomization apparatus for atomization of a melt at high temperature, said atomization apparatus comprising:
    a container;
    a melt guide tube extending from the bottom of said container, said melt guide tube having a melt discharge end for delivery of a melt to a zone at said melt discharge end;
    a gas delivery system surrounding said melt guide tube, said gas delivery system including a gas plenum and a gas plenum exhaust for delivery of atomizing gas into said zone; and
    a flow rate detector surrounding said melt guide tube, said flow rate detector comprising first and second electromagnets, first and second electrodes embedded in said melt guide tube, and a voltage measuring device connected to said first and second electrodes, said first electromagnet comprising a first coil having a single turn and said second electromagnet comprising a second coil having a single turn.

2. The atomization apparatus of claim 1 wherein said first coil and said second coil are both hollow.

3. The atomization apparatus of claim 1 further comprising a first permanent magnet positioned adjacent to said first coil and a second permanent magnet positioned adjacent to said second coil.

4. The atomization apparatus of claim 1 wherein said container is a crucible.

5. The atomization apparatus of claim 1 wherein said container is a tundish.

6. The atomization apparatus of claim 1 wherein said container is a plasma arc melting tundish.

7. The atomization apparatus of claim 1 wherein said container is a cold hearth process tundish.

8. The atomization apparatus of claim 1 wherein said melt guide tube is ceramic.

9. A method of measuring the bottom pour flow rate of a melt flowing through a melt guide tube extending from the bottom of an atomization apparatus, said method comprising the steps of:
    disposing first and second electromagnets around said melt guide tube, said first electromagnet comprising a first coil having a single turn and said second electromagnet comprising a second coil having a single turn;
    producing a magnetic field across said melt guide tube with said first and second electromagnets, thereby inducing an electric field;
    measuring said electric field; and
    determining the bottom pour flow rate from said measured electric field.

* * * * *